May 14, 1963

W. J. HAY, JR 3,089,727

SUPPORTING GLASS SHEETS

Filed July 29, 1960

INVENTOR.
WILLIAM J. HAY, JR.
BY Oscar H. Spencer
ATTORNEY

United States Patent Office 3,089,727
Patented May 14, 1963

3,089,727
SUPPORTING GLASS SHEETS
William J. Hay, Jr., Cheswick, Pa., assignor to Pittsburgh Plate Glass Company, Pittsburgh, Pa., a corporation of Pennsylvania
Filed July 29, 1960, Ser. No. 46,306
5 Claims. (Cl. 294—118)

This invention relates to supporting glass sheets and specifically refers to an improved method of employing tongs for gripping glass sheets during thermal treatment. Tongs have been used for supporting glass sheets vertically for thermal treatment by gripping the opposite glass sheet surfaces near their upper edges. The tongs are supported on an overhead monorail which extends through thermal treatment apparatus by means of a supporting clevis mounted to a carriage that rides on the monorail.

Since glass sheets are heated to substantially the softening point during thermal treatment required for tempering or for certain coating procedures, and since tongs for gripping glass sheets prior to the present invention were provided with tong points that penetrate the glass sheet surfaces deeply and mar the latter, a long felt need existed in the glass handling art to provide tongs that did not penetrate the opposite surfaces of the glass sheet as deeply as the prior art tong point.

Glass sheets are usually suspended from a supporting bar by means of tongs or clamps hung on the supporting bar in such a manner that their tong points at their lower ends grip the glass. It has been found that when tongs are employed to support glass sheets sufficiently large to require gripping by more than one pair of tongs, the opposing tong points are liable to exercise some force on the glass either laterally or torsionally, especially when the glass is engaged by the tongs without due care to insure that the gripping force provided by each pair of tongs is equalized to that provided by each other pair of tongs. These lateral or torsional forces resulting from careless loading cause substantial glass warpage, bowing and kinking of the glass in places adjacent the tong gripping points.

The present invention eliminates tong points from tongs. Consequently, it eliminates the marking of the glass that results from the tong points penetrating the glass sheet surfaces and also reduces optical distortion in the region where the prior art tong points contact the tempered glass plate. Furthermore, the present invention permits higher tempering stresses to be established in the glass sheets by virtue of the avoidance of the aforementioned factors resulting from the deep penetration of the tong points into the glass sheet during the tempering operation.

The glass engaging members substituted for the prior art tong points according to the present invention are disc-like members pivotally mounted for free rotation about axes substantially parallel to the major surfaces of the glass sheet so that their peripheral edges engage the glass sheet near its top edge in pressurized contact with its major surfaces. The free rotation makes the disc-like members capable of self-adjustment. This self-adjustment permits equalization of the gripping force applied by each of a plurality of tongs used to support a single glass sheet. Therefore, bowing, kinking and warping of the glass sheet in the region of the glass gripping elements are substantially eliminated even when the glass sheets are loaded carelessly.

Tongs constructed according to the present invention are substantially similar to conventional tongs, except for the substitution of novel glass gripping elements for the conventional tong points employed in the past. In addition to the self-alignment feature mentioned above, the gripping elements provided by the present invention realize another benefit over the tong points of the prior art. Tongs constructed according to the present invention have appreciable axial extent and therefore impart localized pressure onto the gripped portions of the glass sheet that is substantially less than the pressure resulting from the use of conventional tong points of the prior art.

The reason for this phenomenon is that the tong pressure is calculated by dividing the weight of the glass sheet by the area of the tong gripping elements that contact the glass. While the weight of the glass sheet handled cannot be changed, the gripping elements of the present invention contact a greater area of the glass sheet than the prior art tongs, thus reducing the localized pressure. The reduced pressure reduces the glass penetration at a given temperature and also results in a substantial reduction in stresses established in the tempered glass.

The present invention provides glass sheet gripping means in the form of a pair of opposed glass gripping members, an illustrative example of which comprises disc-shaped members having smooth, peripheral edge surfaces opposing one another on opposite sides of the flat glass sheet engaged therebetween. Means are mounted on each lever arm, preferable in the form of a vertical pin secured to a horizontal arm extending beyond the common hinge pin of each tong arm, to pivot the disc-shaped member freely about the vertical pin or shaft.

A head rivet is attached to the bottom of the vertical pin to support the disc-shaped member and its attached sleeve. The horizontal arm, the vertical pin, the sleeve and the head rivet all cooperate to form means pivotally attaching one of the pair of disc-shaped members in freely pivotable relation to one of the tong arms about a first axis substantially parallel to the major surface of a gripped sheet. The other tong arm is also provided with a horizontal arm, through which is attached a vertical pin to the bottom of which is secured a head rivet, a freely rotatable sleeve to which is secured a disc-shaped member, which freely rotates relative to the vertical pin. As in the case of the other tong arm, its associated horizontal arm, vertical pin, head rivet and the sleeve provide means pivotally attaching the other disc-shaped member in freely pivotable relation to the other tong arm about an axis substantially parallel to the first axis.

According to one embodiment of the present invention, the disc-shaped members have a circular periphery. However, the peripheral edge surface of each of said disc-shaped members may include a relatively flat glass engaging portion according to another embodiment of the present invention.

Embodiments illustrating the present invention will now be described in order to facilitate the reader's understanding of the present invention.

In the drawings which form part of the description, and wherein like reference numerals relate to like structural elements, FIG. 1 is an elevational view of a pair of glass gripping tongs taken across the thickness of a glass sheet;

Figure 1:
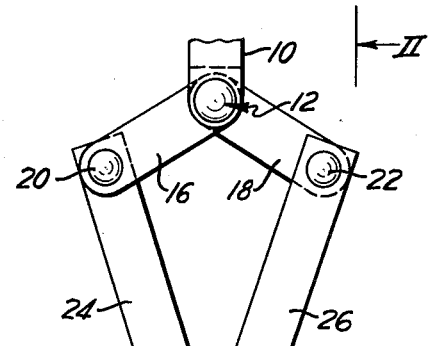

Referring to the drawings, reference number 10 refers to an apertured clevis carried by a carriage (not shown) supported on a monorail (not shown) which extends through a heating furnace and a fluid imparting apparatus, which may be either an air quenching station for tempering apparatus or fluid spraying station for apparatus imparting a coating to the glass surface. Since the heating furnace and the quenching or spraying stations are not part of the present invention, they will not be described in detail.

The clevis aperture provides a support for a tong support pin 12 which is carried thereby. Enlarged head rivets 14 secure the tong support pin 12 in place on the clevis. Links 16 and 18 are pivoted to tong support pin 12 at their upper ends. At their bottom ends, links 16 and 18 carry one of a pair of link pins 20 and 22. Link pins 20 and 22 are provided with enlarged head rivets for the same purpose as tong support pin 12. Tong arms 24 and 26 are apertured at their upper portions to receive one or the other of the link pins 20, 22. Link pin 20 pivotally attaches the upper portion of tong arm 24 to the lower portion of tong arm 16, whereas link pin 22 pivotally secures the lower portion of link 18 to the upper portion of tong arm 26.

A common hinge pin 28 pivotally secures tong arms 24 and 26 to each other at their lower portion. A horizontal arm 30 extends outwardly from the bottom of tong arm 24 to terminate in a vertically apertured end portion 32. Similarly, a horizontal arm 34 extends outwardly in the opposite direction from the bottom of tong arm 26 to terminate in a vertically apertured end portion 36.

A vertical pin 38 is received within end portion 32. Pin 38 is diametrically apertured for alignment with a horizontal aperture 40 in end portion 32. Thus, pin 38 is fixed to end portion 32 by a cotter key extending through the aligned apertures. A diametrically apertured vertical pin 42 is secured to the end portion 36 by means of a cotter key extending through an aperture 44 of end portion 36 in a similar manner as pin 38 is secured to end portion 32.

A sleeve 46 is freely rotatable about pin 38 below horizontal arm 30. Similarly, a sleeve 48 is freely rotatable about pin 42 below horizontal arm 34. A centrally apertured, disc-shaped member 50 having a smoothly surfaced, circular periphery 52 of appreciable axial extent 53 (FIG. 3) is attached coaxially to the bottom of sleeve 46. Similarly, an identical disc-shaped member 54 having a smoothly surfaced, circular periphery 56 also of appreciable axial extent 57 is attached to the bottom of sleeve 48.

An enlarged head rivet 58 is attached to the bottom of vertical pin 38, and a similar enlarged head rivet 60 is attached to the bottom of vertical pin 42. The purpose of the enlarged head rivets 58 and 60 is to hold the disc-shaped members 50 and 54 in opposed relation to each other while supported in freely rotatable relation to pins 38 and 42, respectively.

In normal position to engage the opposite surfaces of a glass sheet G of ¼ inch thickness, the opposing peripheral edge surfaces 52 and 56 of disc-shaped members 50 and 54, respectively, oppose each other to make edgewise contact with the opposite surfaces of the glass sheet near its upper edge. Since the tongs are constructed to perform the normal tong principle of having the weight of the gripped glass sheet urge the tong-gripping elements toward each other so as to engage the opposite surfaces of a sheet gripped therebetween, the opposite surfaces of a glass sheet G are gripped between the periphery 52 of disc-shaped member 50 and periphery 56 of disc-shaped member 54. Thus, if the glass sheet gripped by more than one pair of tongs is inserted incorrectly between two or more pairs of tongs so that the force applied by each pair of tongs is different from that applied by another pair of tongs so as to have an unduly high stress at the vicinity of the gripping elements, the free rotation of the glass engaging members 50 and 54 about the vertical axes provided by the vertical pins 38 and 42 permits the individual glass engaging members to rotate about their respective pivots until their individual gripping forces imposed upon the glass sheet are equalized.

Figure 2:
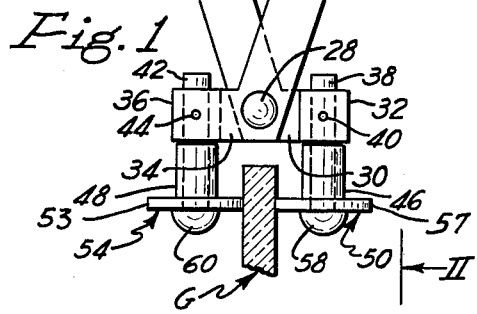
FIG. 2 is an end view taken along the lines II—II of FIG. 1.
Figure 3:
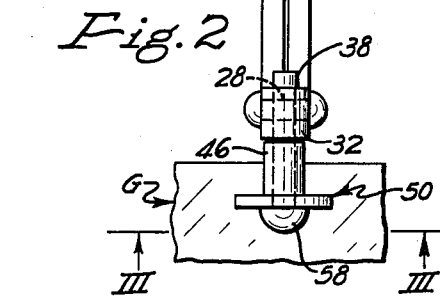
FIG. 3 is a sectional bottom view taken along the lines III—III of FIG. 2.

The embodiment of FIGS. 1 to 3, by permitting the self-alignment of the glass engaging members into positions wherein the forces applied to the glass sheet are equalized, minimizes warpage on the glass resulting from very large lateral or torsion forces imposed on the glass when carelessly loaded, because each pair of opposing glass engaging members imparts a minimum local force on the glass when all the forces are equalized. Furthermore, since the discs have peripheral surfaces having appreciable axial extent that form tangential contact with the glass, thus increasing the area of contact from a point to a tangential area, and the pressure applied to grip the glass is determined by the weight of the glass divided by the area over which the force is applied, the localized pressure is reduced from that provided by point contact. Therefore, the localized pressure provided by the embodiment of FIGS. 1 to 3 is reduced compared to that provided by tongs provided with opposed tong points.

Figure 4:
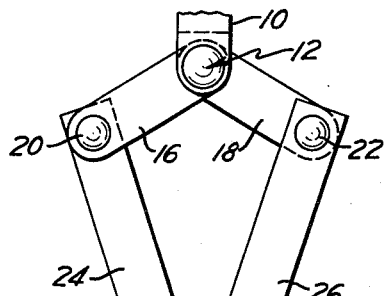
FIGS. 4 and 5 are views of an alternate embodiment similar to the views shown in FIGS. 1 and 3, respectively.
Figure 5:
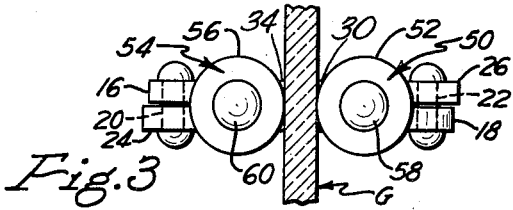

The embodiment of FIGS. 4 and 5 is identical to that of FIGS. 1 to 3, except that in the embodiment of FIGS. 4 and 5 the disc-shaped members 70 and 72 attached to sleeves 46 and 48, respectively, have their respective smooth, peripheral edge surfaces 74 and 76 provided with a relatively flat glass engaging portion 78 or 80. The purpose of the relatively flat glass engaging portion is to increase the area over which the force is applied. This further reduces the pressure applied to the opposite surfaces of the glass sheet, but such reduction in pressure is obtained at the expense of minimizing the adjustability of the tongs to equalize the forces applied by each of a plurality of pairs of gripping members to reduce the localized stresses. However, if the glass sheet is loaded carefully into the tongs in the latter embodiment, the increase in contact area between the gripping members and the glass reduces the individual pressures to such an extent that it is quite likely to compensate for any increase in localized pressure caused by unequal loading.

The above description of illustrative embodiments of the present invention is for illustration rather than limitation, because many variations from the specific structure, such as substituting conically or spherically shaped glass engaging elements that have a circular or substantially circular glass contacting surface may be substituted for the discs illustrated. Other obvious mechanical equivalents for the freely rotatable glass engaging members will become obvious in the light of the foregoing description.

What is claimed is:

1. In tongs for supporting a glass sheet in a substantially vertical plane and comprising a tong support pin, a pair of links having an upper portion and a lower portion, each link being pivoted at its upper portion to said tong support pin, a pair of link pins, a pair of tong arms having an upper portion and a lower portion, one of said link pins pivotally connecting the lower portion of one of said links and the upper portion of one of said tong arms, the other of said link pins pivotally connecting the lower portion of the other of said links with the upper portion of the other of said tong arms, a common hinge pin pivotally connecting said tong arms together at a point below said link pin connections, and glass sheet gripping means carried by each of said tong arms below said common hinge pin in opposing relation to one another for engaging the opposite surfaces of said glass sheet near its top edge, the improvement in said glass sheet gripping means comprising a pair of opposed glass engaging members having smooth, peripheral edge surfaces opposing one another to engage the opposite sides of a flat glass sheet therebetween, means pivotally attaching one of said pair of glass engaging members in freely pivotable relation to one of said tong arms about a first axis substantially parallel to the surface of said engaged glass sheet, and means pivotally attaching the other of said pair of glass engaging members in freely pivotable relation to the other of said tong arms about an axis substantially parallel to said first axis, each of said glass engaging members being pivotally attached concentrically thereof to said pivotally attaching means.

2. The improvement according to claim 1, wherein said glass engaging members are disc-shaped members having a substantially circular periphery.

3. The improvement according to claim 1, wherein said glass engaging members are disc-shaped members, provided with a round peripheral edge surface which includes a relatively flat glass engaging portion.

4. In the art of supporting glass sheets during treatment wherein a glass sheet is gripped between opposing glass gripping members that engage the opposite surfaces thereof near its top edge and the sheet is suspended therefrom in a given plane, the improvement comprising gripping the major surfaces of the glass sheet near its top edge between a pair of opposed glass engaging members having smooth, peripheral edge surfaces having appreciable axial extent opposing one another and which are free to rotate about axes substantially parallel to the plane in which said sheet is suspended, and maintaining the smooth, peripheral edge surfaces of said opposed, freely rotatable glass engaging members in pressurized relation against the opposite surfaces of said glass sheet throughout said treatment.

5. The improvement according to claim 4, wherein said glass engaging members are each mounted concentrically with respect to its associated axis of rotation.

References Cited in the file of this patent

UNITED STATES PATENTS

| | | |
|---|---|---|
| 1,514,863 | Rytell | Nov. 11, 1924 |
| 1,628,563 | Taylor | May 10, 1927 |
| 2,103,850 | Hinsey | Dec. 28, 1937 |
| 2,151,266 | Clitherow | Mar. 21, 1939 |
| 2,174,254 | Black | Sept. 26, 1939 |
| 2,305,054 | Ash | Dec. 15, 1942 |

FOREIGN PATENTS

| | | |
|---|---|---|
| 416,790 | Italy | Dec. 16, 1946 |